US012027340B2

(12) United States Patent
Calvey et al.

(10) Patent No.: US 12,027,340 B2
(45) Date of Patent: Jul. 2, 2024

(54) PINCER MOUNT CATHODE

(71) Applicant: Kimball Physics, Inc., Wilton, NH (US)

(72) Inventors: Andrea Michelle Calvey, Peterborough, NH (US); George Douglas Calvey, Peterborough, NH (US)

(73) Assignee: KIMBALL PHYSICS, INC., Wilton, NH (US)

( * ) Notice: Subject to any disclaimer, the term of this patent is extended or adjusted under 35 U.S.C. 154(b) by 0 days.

(21) Appl. No.: 18/510,302

(22) Filed: Nov. 15, 2023

(65) Prior Publication Data

US 2024/0161994 A1 May 16, 2024

Related U.S. Application Data

(60) Provisional application No. 63/425,802, filed on Nov. 16, 2022.

(51) Int. Cl.

| | |
|---|---|
| ***H01J 1/18*** | (2006.01) |
| ***H01J 1/146*** | (2006.01) |
| ***H01J 1/88*** | (2006.01) |
| ***H01J 9/08*** | (2006.01) |

(52) U.S. Cl.

CPC ................ *H01J 1/18* (2013.01); *H01J 1/146* (2013.01); *H01J 1/88* (2013.01); *H01J 9/08* (2013.01); *H01J 2201/2889* (2013.01)

(58) Field of Classification Search

CPC ...... H01J 1/18; H01J 1/146; H01J 1/88; H01J 2201/2889

See application file for complete search history.

(56) References Cited

U.S. PATENT DOCUMENTS 4,258,283 A * 3/1981 Brunger .................... H01J 1/16 313/346 R
6,903,499 B2 6/2005 Terui et al.
7,863,805 B2 1/2011 Yamamoto et al.
8,456,076 B2 6/2013 Morishita et al.

(Continued)

FOREIGN PATENT DOCUMENTS

JP S55171949 U 12/1980
KR 20060127321 A 12/2006

OTHER PUBLICATIONS

"Cathodes & Filaments for Electron Microscopes," Edition 3, Electron Microscopy Sciences Mini Catalog, 12 pages (Feb. 2020).

(Continued)

*Primary Examiner* — Anne M Hines

(74) *Attorney, Agent, or Firm* — Hamilton, Brook, Smith & Reynolds, P.C.

(57) ABSTRACT

A cathode device includes an emitter tip for generating electrons. An elongate heater is included having proximal and distal ends. The emitter tip can be located at the distal end of the heater. Two spaced apart legs can extend away from the distal end of the heater, terminating at the proximal end and forming an elongate slot therebetween. Two electrical contacts can compressively engage respective opposite outer surfaces of the two legs at the proximal end of the heater to mechanically secure and electrically connect the two legs of the heater to respective electrical contacts at a junction that is at a location spaced away from the emitter tip to keep the junction cooler.

26 Claims, 16 Drawing Sheets

(56) References Cited

U.S. PATENT DOCUMENTS

| | | | | |
|---|---|---|---|---|
| 8,987,982 | B2 | 3/2015 | Magera et al. | |
| 2012/0098409 | A1 * | 4/2012 | Dou | H01J 37/065 313/341 |
| 2021/0305006 | A1 * | 9/2021 | Liu | H01J 1/92 |
| 2022/0208506 | A1 | 6/2022 | O'Farrell | |

OTHER PUBLICATIONS

"ES-423E (Extended Life) LaB6 Crystal," in LaB6 Cathodes, Single-Crystal Lanthanum Hexaboride, Kimball Physics Inc., 3 pages; Retrieved from the Internet at: https://www.kimballphysics.com/downloadable/download/sample/sample_id/1292/ Retrieved on: Dec. 2, 2022.

"Descriptions of Electron Microscope Cathodes and Emitters," Retrieved from the Internet at: https://ravescientific.com/education/32-descriptions-of-electron-microsc . . . , Retrieved from the Internet on: Dec. 8, 2022, 5 pages.

Tip Emitter Assembly, Part/Model No. 101381, HeatWave, 2 pages Retrieved from the Internet at: https://www.cathode.com/pdf/101381A.pdf Retrieved on: Dec. 2, 2022.

International Search Report and Written Opinion for Int'l Application No. PCT/US2023/079808, Date Mailed: Apr. 29, 2024, 23 pages.

Invitation to Pay Additional Fees and Where Applicable Protest Fee and Communication Relating to the Results of the partial International Search Report for PCT/US2023/079808, dated Mar. 7, 2024.

* cited by examiner

PINCER MOUNT CATHODE

RELATED APPLICATION

This application claims the benefit of U.S. Provisional Application No. 63/425,802, filed on Nov. 16, 2022. The entire teachings of the above application is incorporated herein by reference.

BACKGROUND

Thermionic cathodes utilizing $LaB_6$ as the electron emitter can include a graphite-based joule heating element. Electron emission is directly related to the temperature of the emitter. Therefore, fluctuations in heating current and/or thermal grounding to the graphite heater degrade the performance of the cathode by causing emission fluctuations. All junctions between the power source and the graphite heater must be extremely stable to provide consistent performance. Unstable connections result in fluctuating thermal or electrical resistance that causes changes in emission. These instabilities can arise from poor electrical contact, or, in the case of extremely hot junctions, form chemical reactions between materials and mechanical instabilities. For best performance, electrical junctions should be firmly clamped and thermally grounded. The most challenging electrical junction is the one connecting directly to the end of the graphite heater, where temperatures can be high.

SUMMARY

The present disclosure can provide a cathode device with an electrical contact junction that operates at a lower temperature than in the prior art, with more stable electrical resistance. The cathode device can include an emitter element for generating electrons. An elongate graphite heater having proximal and distal ends can be included, and the emitter element can be mounted to the distal end of the graphite heater in an emitter mount that is located at the distal end. The distal end of the graphite heater can be a solid rod which diverges into two spaced apart legs which can extend from the emitter mount, terminating at the proximal end and forming an elongate slot therebetween. Two electrical contacts can compressively engage respective opposite outer surfaces of the two spaced apart legs at the proximal end of the graphite heater to mechanically secure and electrically connect the two legs of the graphite heater to the respective electrical contacts at a junction that is at a location spaced away from the emitter element to keep the junction cooler, and at the same time provide good thermal grounding. The elongate shape of the graphite heater reduces heat conduction from the hottest parts of the heater into the electrical junctions. This, combined with the efficient thermal grounding at the proximal end allows the junction temperature to remain low even when the emitter is very hot.

In particular embodiments, the two electrical contacts can be resiliently biased against the legs and towards each other. Each electrical contact can include a metallic pin having a proximal portion extending along a longitudinal axis. Each pin can have a distal contact portion that is bent transverse to the longitudinal axis. Each pin can be rotationally biased about a respective longitudinal axis to bias the distal contact portion of each pin against a respective leg and towards each other. The proximal portion of each pin can extend through an insulating member along a respective longitudinal axis.

The present disclosure can also provide a cathode device including an emitter tip for generating electrons. An elongate heater can be included having proximal and distal ends. The emitter tip can be located at the distal end of the heater. Two spaced apart legs can extend away from the distal end of the heater, terminating at the proximal end and forming an elongate slot therebetween. Two electrical contacts can compressively engage respective opposite outer surfaces of the two legs at the proximal end of the heater to mechanically secure and electrically connect the two legs of the heater to respective electrical contacts at a junction that is at a location spaced away from the emitter tip to keep the junction cooler.

In particular embodiments, the two electrical contacts can be resiliently biased against the legs and towards each other. Each electrical contact can include a metallic pin having a proximal portion extending along a longitudinal axis. Each pin can have a distal contact portion that is bent transverse to the longitudinal axis. Each pin can be rotationally biased about a respective longitudinal axis to bias the distal contact portion of each pin against a respective leg and towards each other. The proximal portion of each pin can extend through an insulating member along a respective longitudinal axis. In one embodiment, the distal contact portion of each pin can be bent at a right angle to the longitudinal axis. In one embodiment, the emitter tip can be an emitter element that is mounted to an elongate graphite heater in emitter mount at the distal end of the graphite heater. In another embodiment, the emitter tip and the elongate heater can be in a single piece heater/emitter formed from a unitary piece of refractory metal. In some embodiments, the single piece heater/emitter can be formed of tungsten or tungsten alloy. An electrical insulating spacer member can be compressed between the two spaced apart legs of the heater at the proximal end of heater.

The present disclosure can also provide a method of forming a cathode device including providing an emitter element for generating electrons. An elongate graphite heater can be provided and have proximal and distal ends. The emitter element can be mounted to the graphite heater in an emitter mount located at the distal end. The distal end of the graphite heater can be a solid rod which diverges into two spaced apart legs which can extend from the emitter mount, terminating at the proximal end and forming an elongate slot therebetween. Two electrical contacts can compressively engage respective opposite outer surfaces of the two spaced apart legs at the proximal end of the graphite heater to mechanically secure and electrically connect the two legs of the graphite heater to respective electrical contacts at a junction that is at a location spaced away from the emitter element to keep the junction cooler, and at the same time provide good thermal grounding.

In particular embodiments, the two electrical contacts can be resiliently biased against the legs and towards each other. Each electrical contact can include a metallic pin having a proximal portion extending along a longitudinal axis. Each pin can have a distal contact portion that is bent transverse to the longitudinal axis. Each pin can be rotationally biased about a respective longitudinal axis to bias the distal contact portion of each pin against a respective leg and towards each other. The proximal portion of each pin can extend through an insulating member along a respective longitudinal axis.

The present disclosure can also provide a method of forming a cathode device including providing an emitter tip for generating electrons. An elongate heater can be provided, and have proximal and distal ends. The emitter tip can be located at the distal end of the heater. Two spaced apart legs can extend away from the distal end of the heater, terminating at the proximal end and forming an elongate slot therebetween. Two electrical contacts can compressively engage respective opposite outer surfaces of the two spaced apart legs at the proximal end of the heater to mechanically secure and electrically connect the two legs of the heater to respective electrical contacts at a junction that is at a location spaced away from the emitter tip to keep the junction cooler.

In particular embodiments, the two electrical contacts can be resiliently biased against the legs and towards each other. Each electrical contact can include a metallic pin having a proximal portion extending along the longitudinal axis. Each pin can have a distal contact portion that is bent transverse to the longitudinal axis. Each pin can be rotationally biased about a respective longitudinal axis to bias the distal contact portion of each pin against a respective leg and towards each other. The proximal portion of each pin can be extended through an insulating member along a respective longitudinal axis. In some embodiments, the distal contact portion of the pin can be provided with a bend at a right angle to the longitudinal axis. In some embodiments, the emitter tip can have an emitter element that is mounted to an elongate graphite heater in an emitter mount at the distal end of the graphite heater. In another embodiment, the emitter tip and the elongate heater can be in a single piece heater/emitter formed from a unitary piece of refractory metal. The single piece heater/emitter can be formed of tungsten or tungsten alloy. An electrical insulating spacer member can be compressed between the two spaced apart legs of the heater at the proximal end of the heater.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
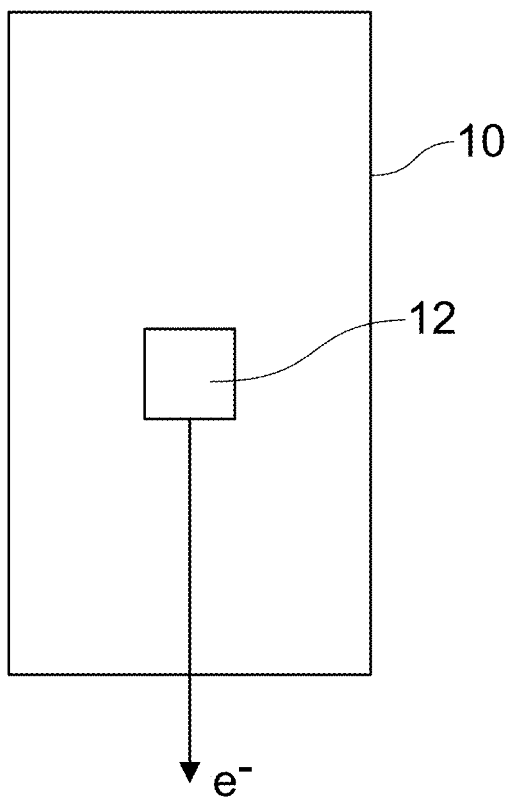
FIG. 1 is a schematic drawing of an electron emitter having a cathode device.
Figure 2A:
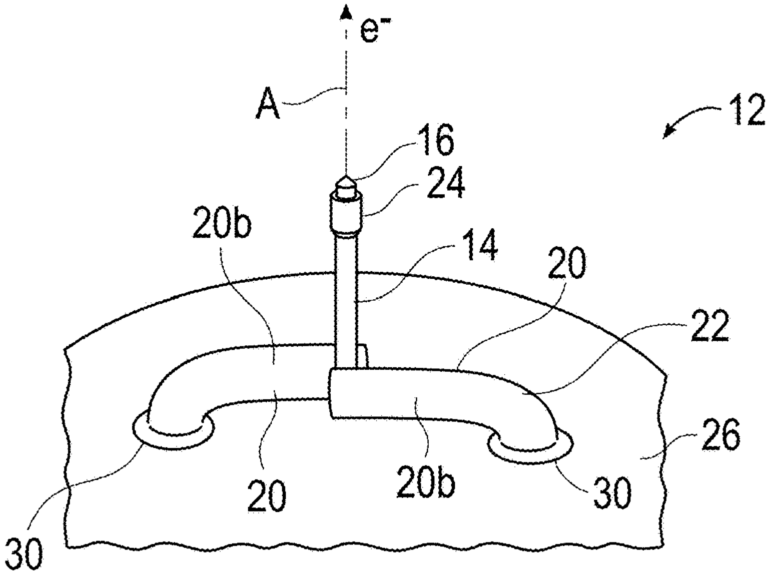
FIGS. 2A-4 are perspective views of portions of an embodiment of a cathode device in the present disclosure.
Figure 2B:
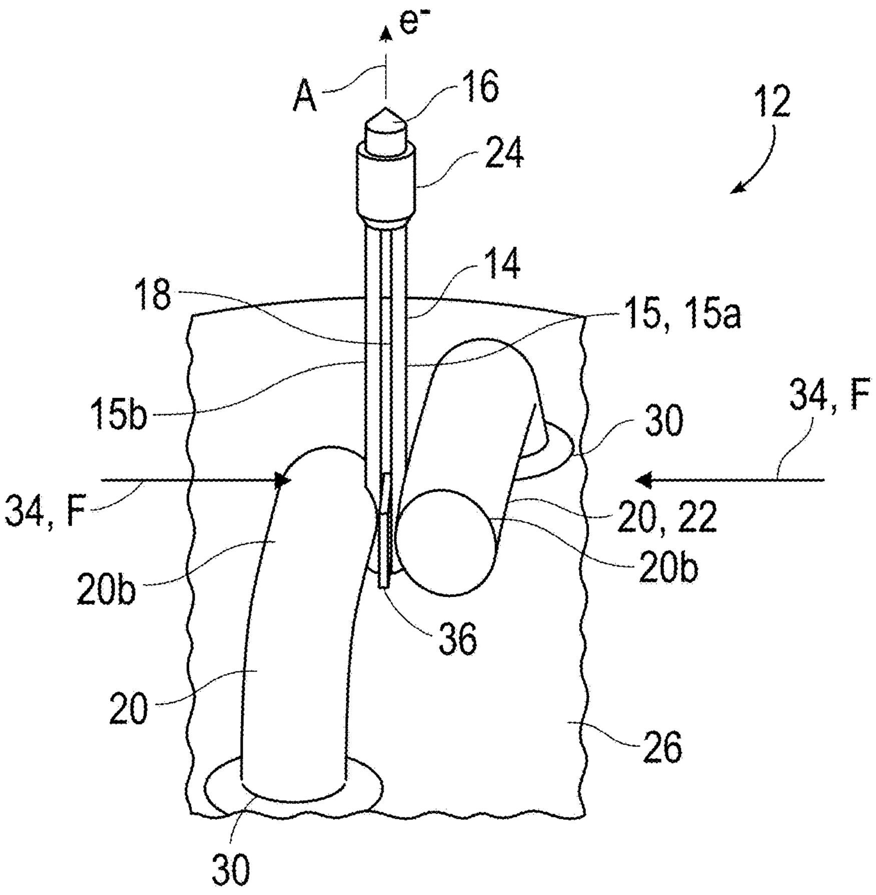
Figure 3:
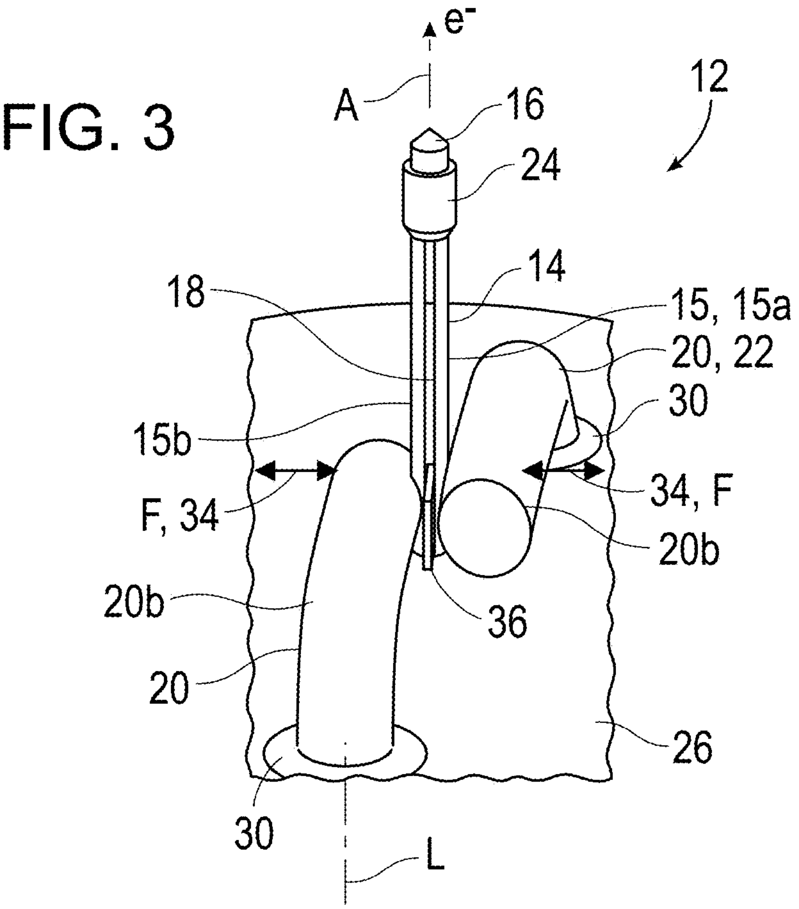
Figure 4:
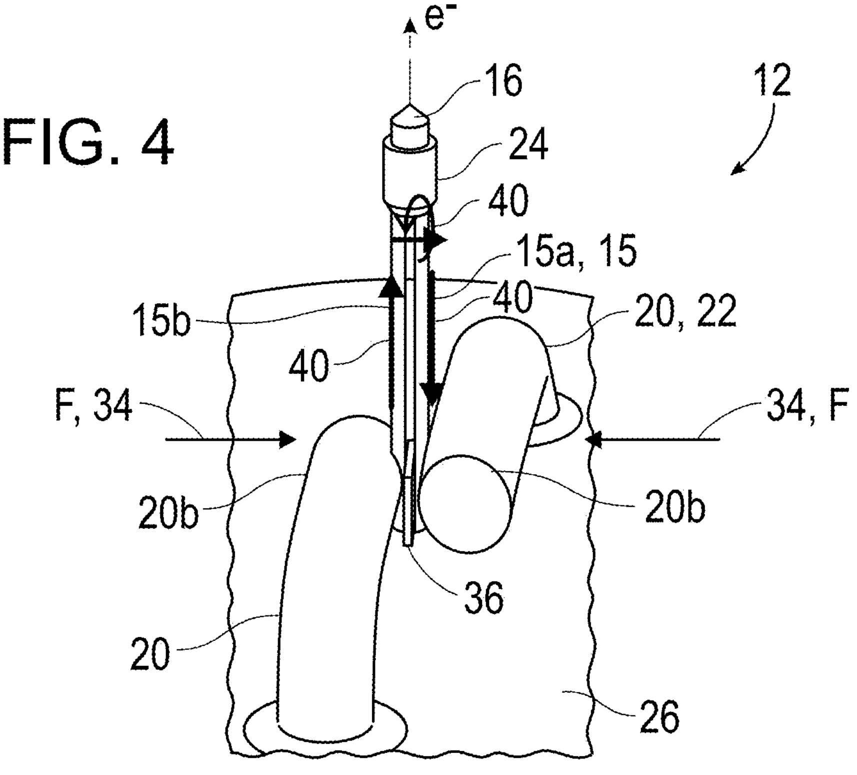
Figure 5A:
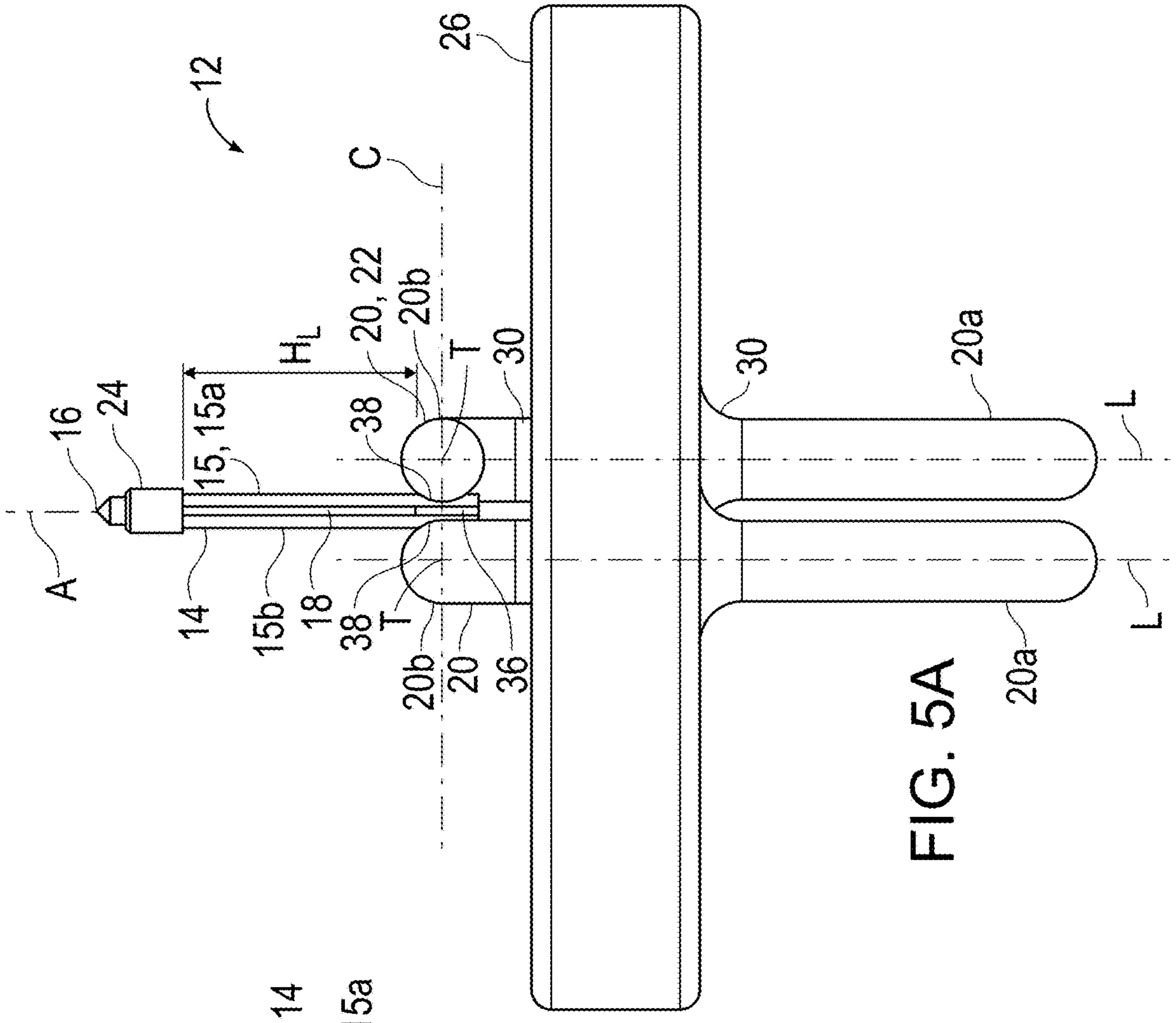
FIG. 5A is a side view of an embodiment of a cathode device and FIG. 5B is a cross sectional view of a split rod portion of a graphite heater.
Figure 5B:
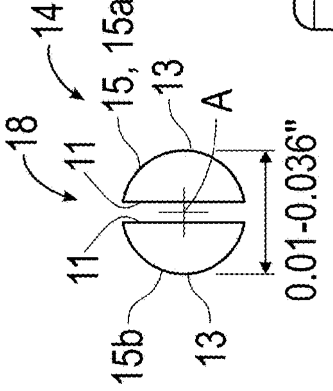

Referring to FIG. 1, an electron emitter or gun 10 in the present disclosure can include a cathode device 12 for generating electrons $e^-$, and can be a pincer mount cathode device. Referring to FIGS. 2A-6E, embodiments of the cathode device 12 can include an elongate graphite or carbon heater or heater rod 14 that supports an emitter tip or element, or a cathode element 16, for emitting electrons $e^-$, such as a $LaB_6$ (lanthanum hexaboride) or $CeB_6$ (cerium hexaboride) crystal on an intermediate connecting or transition portion, or emitter mount 24, located at the distal end of the graphite heater 14. The graphite heater 14, emitter mount 24 and emitter element 16 can extend along a central longitudinal emitter axis A, and the electrons $e^-$ can be emitted by emitter element 16 along axis A. The graphite heater 14 can have an elongate split rod portion 15 extending along axis A forming two spaced apart elongate legs 15*a* and 15*b* on opposite sides of axis A, with an elongate space, opening or slot 18 therebetween, extending away from the distal end of the graphite heater 14 from the emitter mount 24 and terminating at the proximal end of the graphite heater 14. Referring to FIG. 5B, each leg 15*a* and 15*b* can have an outwardly facing curved of rounded surface 13, and a flat inwardly facing surface 11. The inwardly facing surfaces 11 of the legs 15*a* and 15*b* can face each other and form the slot 18 therebetween.

An electrical connection or connector 22 having two resilient or spring-loaded electrical contacts, contact members or pins 20 can be coupled, connected, secured, fixed or bonded to an insulating member 26, such as a ceramic disk, for example by brazing in a brazed joint 30. The two electrical contacts or pins 20 can be metallic pins such as molybdenum, molybdenum—rhenium or molybdenum alloy pins. The pins 20 can resiliently compressively engage opposite or opposing outer surfaces 13 of the two spaced apart legs 15*a* and 15*b* of the graphite heater 14 for mechanical securement, compression or clamping therebetween along a lateral clamp axis C, and for electrical connection to respective legs 15*a* and 15*b*. Each pin 20 can have an elongate straight proximal portion 20*a* extending along a longitudinal axis L, and an elongate straight distal contact portion 20*b* that is bent transverse and extends along an angled or transverse axis T that is at an angle, perpendicular, or at a right angle, to the proximal portion 20*a* and the longitudinal axis L. The two pins 20 can extend through holes 32 in the insulating member 26, each along a respective longitudinal axis L for connection to electrical power. The distal ends of the transverse distal contact portions 20*b* can extend generally parallel and adjacent to each other, and can be resiliently pried open or apart from each other to form a slight gap therebetween. The distal contact portions 20*b* can be slightly spaced apart from or above and parallel to the upper surface of the insulating member 26. The distal contact portion 20*b* of each pin 20 can be bent relative to the proximal portion 20*a* just above the upper surface of the insulating member 26. The distal contact portion 20*b* of each pin 20 can be laterally or rotationally resilient, biased or spring loaded, about a respective longitudinal axis L in the direction of arrow 34 to resiliently compressively engage and compress, clamp or capture the legs 15*a* and 15*b* of the graphite heater 14 between the two distal contact portions 20*b* with a resilient spring force F. A small narrow flat electrical insulating spacing or spacer member or spacer 36 can be positioned between the two legs 15*a* and 15*b* and can be compressed therebetween. The spacer 36 can provide a more secure and stable mechanical and electrical connection between the legs 15*a* and 15*b* of the graphite heater 14 and the distal contact portions 20*b*, by limiting the amount or distance that the legs 15*a* and 15*b* can move or compress towards each other. In some embodiments, the inner facing surface of each distal contact portion 20*b* can include a rounded or curved groove or recess 38 extending parallel to and on opposite sides of central axis A, for accepting the curved outer surface 13 of a respective leg 15*a* and 15*b* to help locate, capture and firmly mechanically secure the legs 15*a* and 15*b* of the graphite heater 14 therebetween, while at the same time providing a secure and stable electrical connection therebetween at electrical junction 28. The diameter and lengths of the proximal 20*a* and distal portions 20*b* of the pins 20 can be varied to provide a resilient spring force F or bias for each pin ranging between about 1-3.5 pounds. For a 0.016 inch diameter graphite heater 14, this can result in a holding pressure of about 4000-13,000 psi for secure attachment. Depending upon the dimensions of the pins 20, the lateral spring force F (FIG. 6A) of each pin 20 against each leg 15*a* and 15*b* can include resilient torsion of the pin 20 about longitudinal axis L forming a resilient torsional spring force, and/or resilient bending of the distal contact portion 20*b* relative to transverse axis T and/or axis L, forming a cantilever beam spring force. The location at which the legs 15*a* and 15*b* of the graphite heater 14 engage the distal contact portions 20*b*, can be at a moment arm spaced apart from each longitudinal axis L, that is the distance between axes L and A.

Figure 7A:
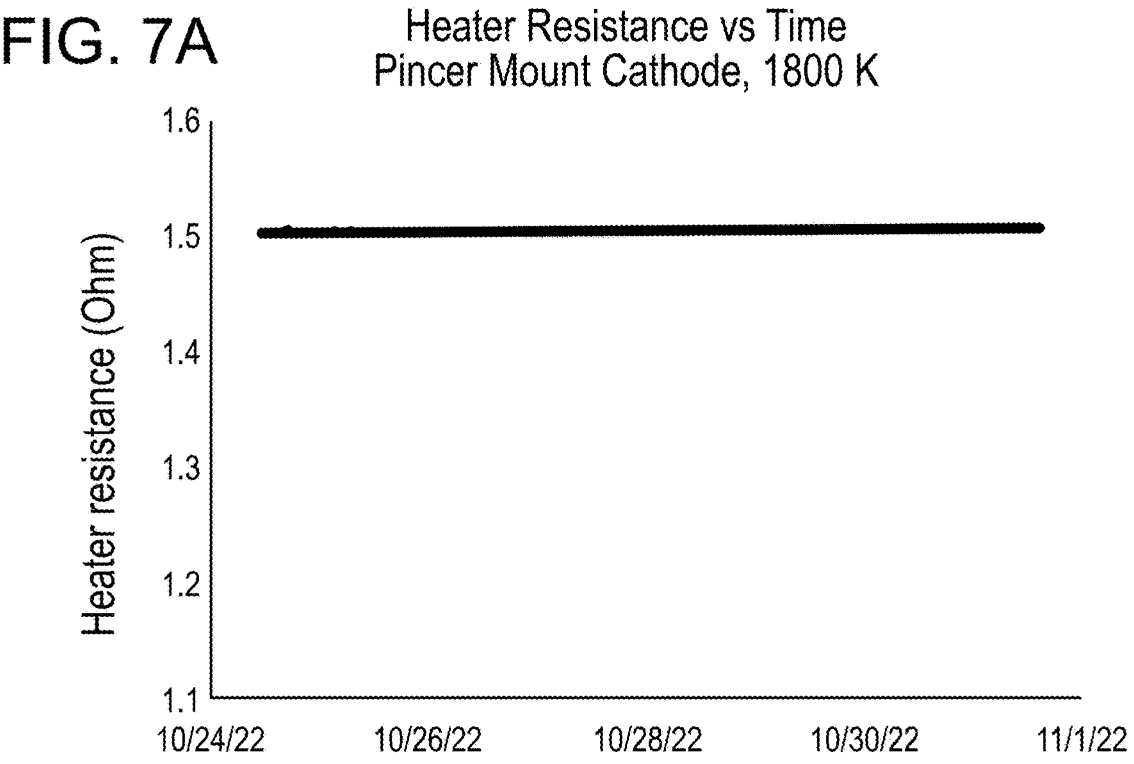
FIGS. 7A and 7B depict comparison graphs comparing heater resistance of the present disclosure pincer mount cathode and prior art cathodes.
Figure 7B:
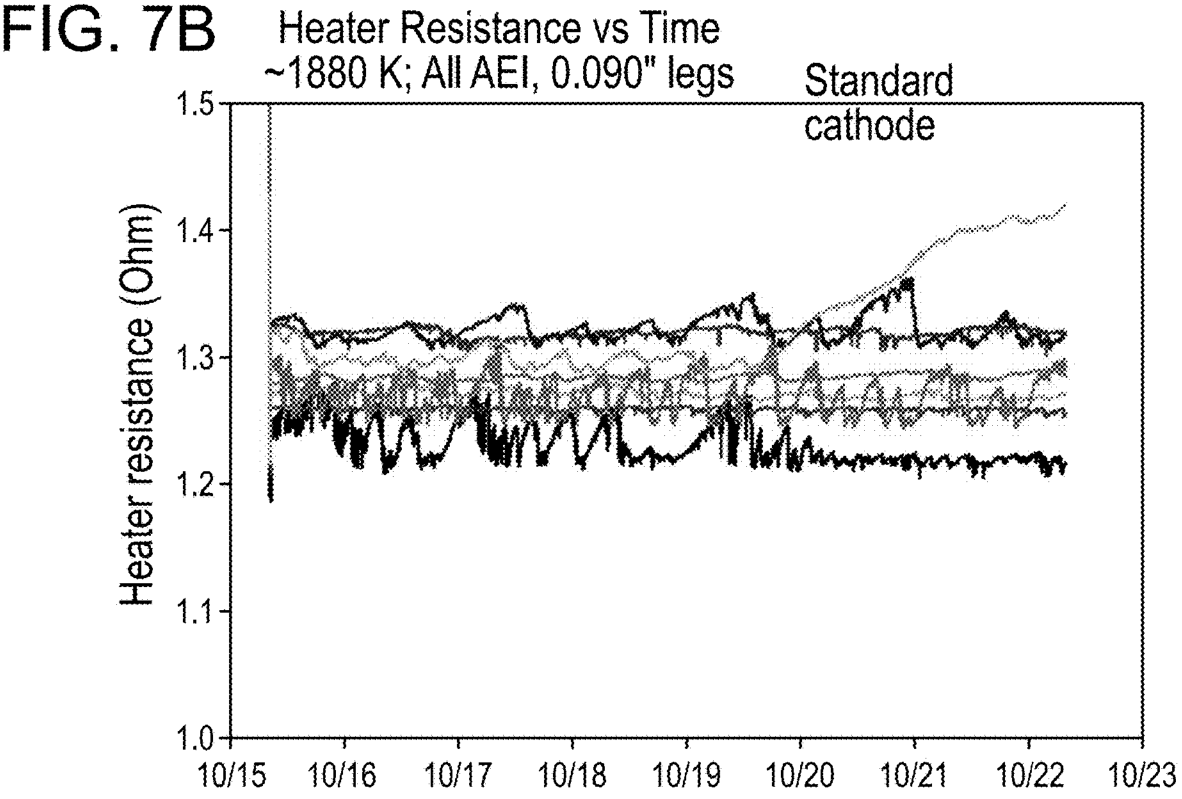
Figures 8A, 8B, 8C, 8D:
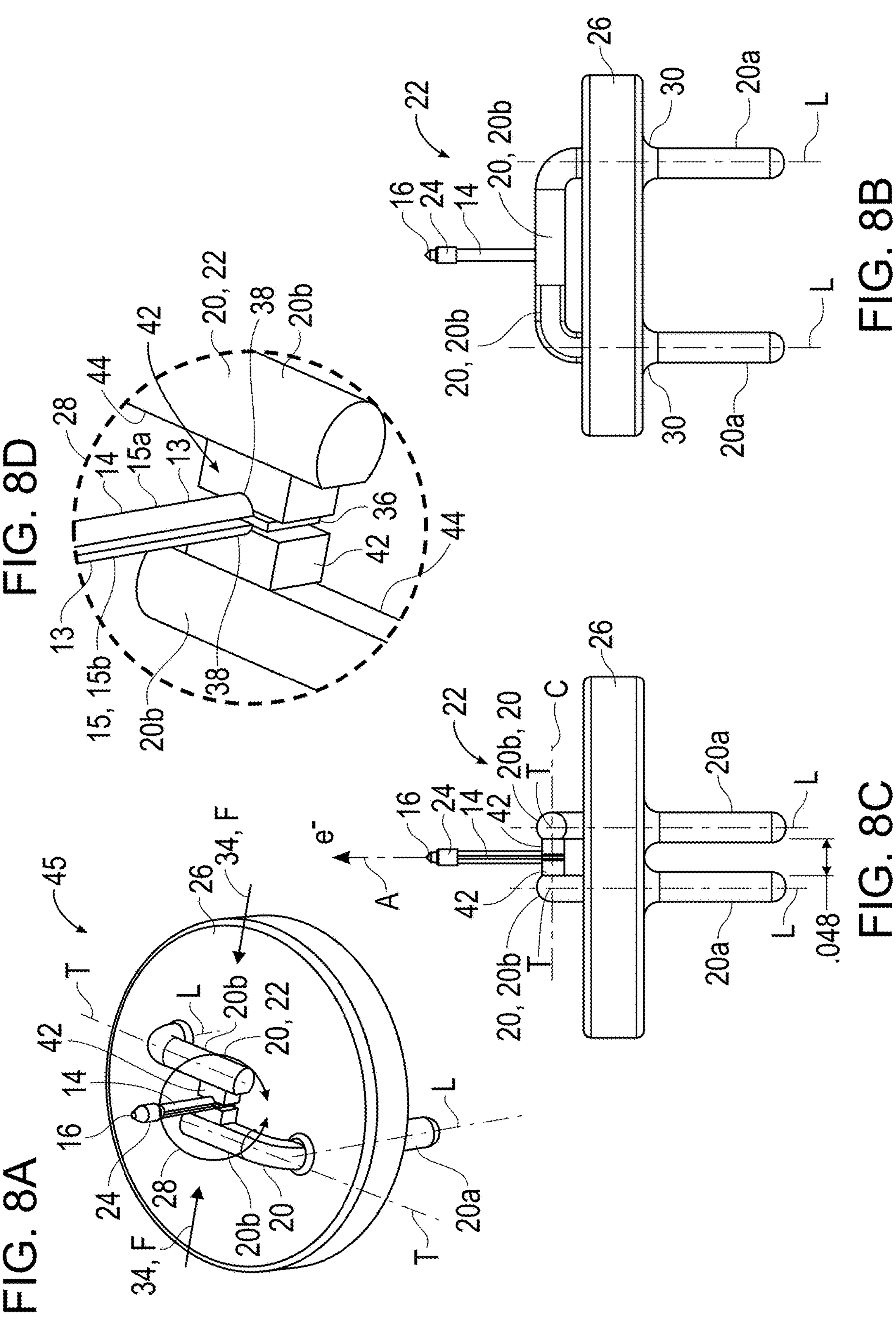
FIGS. 8A-8D are detailed drawings of another embodiment of a cathode device, having perspective, front, side and enlarged views thereof.

By securing the proximal ends of the legs 15*a* and 15*b* of the graphite heater 14 between the two distal contact portions 20*b* of the pins 20 at a location spaced away from the $LaB_6$ crystal emitter tip 16, heat conduction from the hottest parts of the heater 14 into the electrical junction 28 is reduced. As seen in FIG. 4 by the direction of the arrows 40, the electrical current flows up one leg 15*a*, across the emitter mount 24 at the distal end of the heater 14 or down the other leg 15*b* in an opposite direction parallel to the current in leg 15*a*. The bi-directional electrical current partially cancels and reduces magnetic fields at the emitter tip 16. Spacing the hot emitter tip 16 away from the electrical junction 28, combined with the efficient thermal grounding at the electrical junction 28 between the graphite heater 14 and the pins 20, allows the electrical junction 28 temperature to remain low even when the emitter 16 is very hot. The pins 20 can act as heat sinks that are thermally connected or grounded to the larger heat sink of insulating member 26. The rounded or curved grooves 38 in the distal contact portions 20*b* can increase the contact surface area between the legs 15*a* and 15*b* of the heater 14, which increases the thermal contact heat sink surface area for better heat sink capabilities as well as increase electrical contact surface area for providing a more stable electrical connection. Keeping the electrical connection or junction 28 cooler reduces chemical reactions and mechanical motion of the components, resulting in more consistent electrical resistance in the present disclosure pincer mount cathode device 12 in comparison to prior art standard cathode devices, as shown in the comparison graphs of FIGS. 7A and 7B. The consistent electrical resistance can allow the present disclosure cathode device 12 and the electron emitter 10 to operate more consistently with the less electron emission variations, thereby providing consistent electron $e^-$ emission.

Figure 6A:
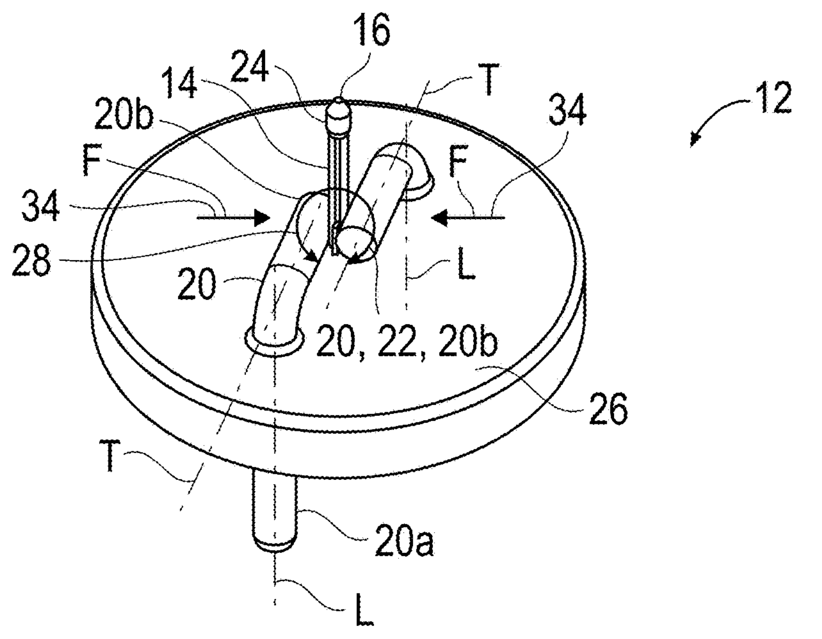
FIGS. 6A-6E are detailed drawings of the cathode device of FIG. 5A, having perspective, front, side and enlarged views thereof.
Figure 6B:
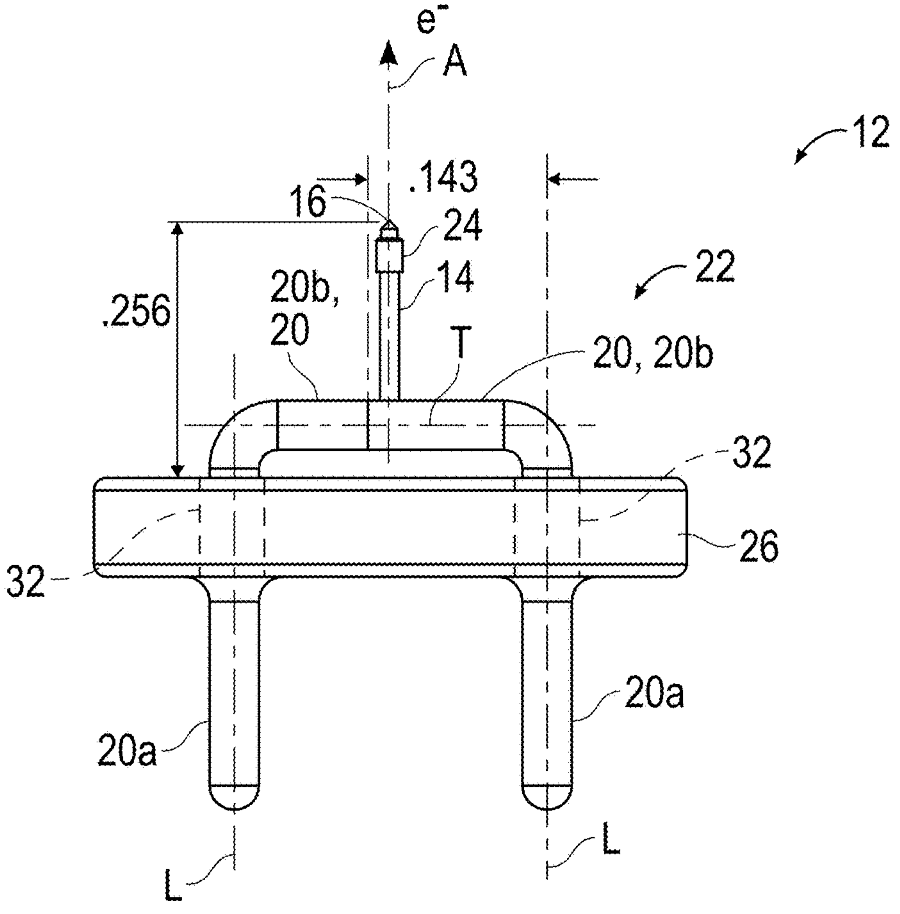
Figure 6C:
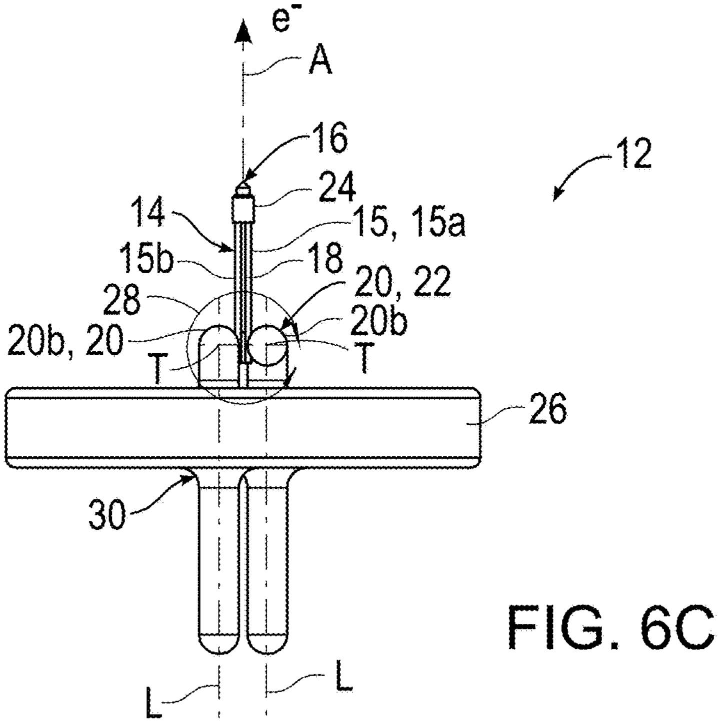
Figure 6D:
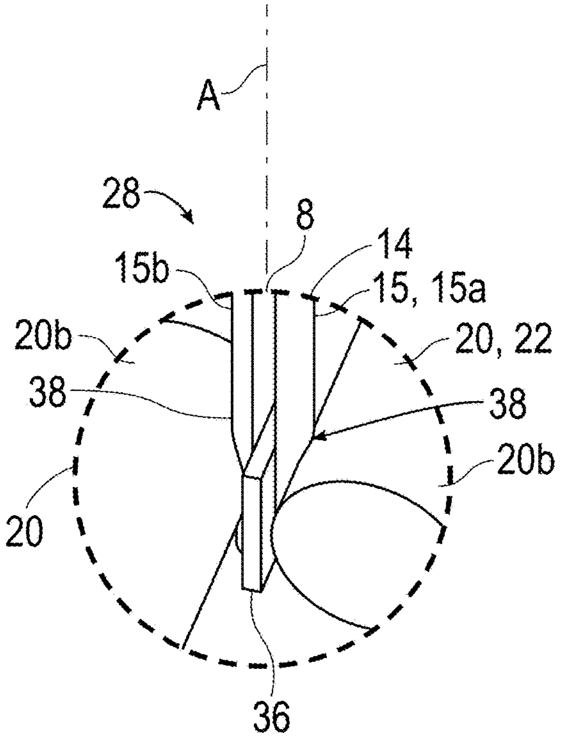
Figure 6E:
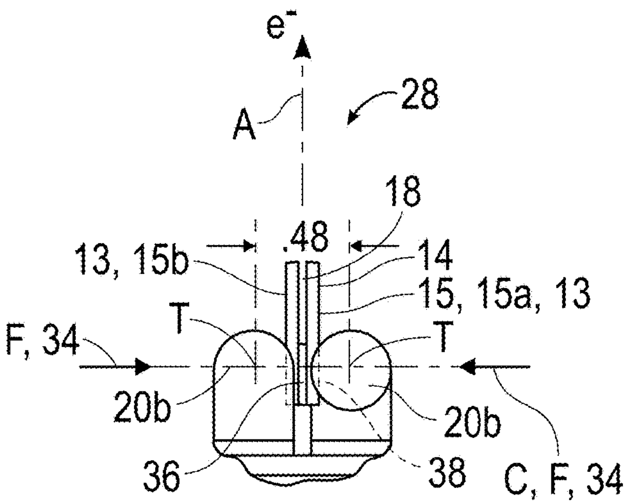

In some embodiments, the graphite heater 14 can be formed of non-pyrolytic graphite, but is not limited thereto. The diameter of the heater rod 14 can range from about 0.01-0.036 inches before splitting. The width of the slot 18 can be about 0.003-0.008 inches wide. The heater rod 14 does not have to have a circular cross-section, and in some embodiments can have a rectangular cross-section. The electrical power provided to the cathode device 12 can have a source voltage of about 2-4 volts with a source current of about 1-4 amps. The emitter element 16 can have a crystal tip ranging from a full cone point (0 μm flat), to a tip flat of about 2 mm, and in some instances to a tip flat of about 3 mm. The operating temperature of the emitter element 16 can range from about 1500-1900° K. In some embodiments, the pins 20 can have a diameter about 0.039 inches. The horizontal lengths of the distal pin portions 20*b* from the longitudinal axis L in one embodiment can be about 0.143 inches (FIG. 6B), but in other embodiments, can range from about 0.0625 to 0.25 inches. The exposed height of the legs 15*a* and 15*b* $H_L$ (FIG. 5A) of the graphite heater 14 between the intermediate transition or connecting portion, or emitter mount 24, and contact with the distal contact portions 20*b*, can range from about 0.05 to 0.2 inches and greater, for providing a thermal isolation or spacing distance of the emitter element 16 and emitter mount 24 from the electrical junction 28 and distal contact portions 20*b*. In addition, the height of the tip of the emitter element 16 from the upper surface of the insulating member 26 can be in some embodiments about 0.256 inches, and in other embodiments can range from about 0.2 to 1 inches, for providing thermal isolation or spacing. Referring to FIG. 6E, the distance between the transverse axes T when clamping heater 14 can be about 0.048 inches in the embodiment shown.

FIGS. 8A-8D depict another embodiment of a cathode device 45 in the present disclosure in which the distal contact portions 20*b* of the pins 20 of the cathode device 45 can capture two graphite clamping blocks 42, for securing the legs 15*a* and 15*b* of the graphite heater 14 therebetween. The distal contact portions 20*b* can have inwardly facing flats 44 for engaging flat outer surfaces of the graphite clamping blocks 42. The inner surfaces of the clamping blocks 42 can have rounded or curved recesses or grooves 38 extending parallel to axis A for capturing opposite outer surfaces 13 of the legs 15*a* and 15*b* of the graphite heater 14, in a manner similar to that shown in FIG. 6E.

Figure 9:
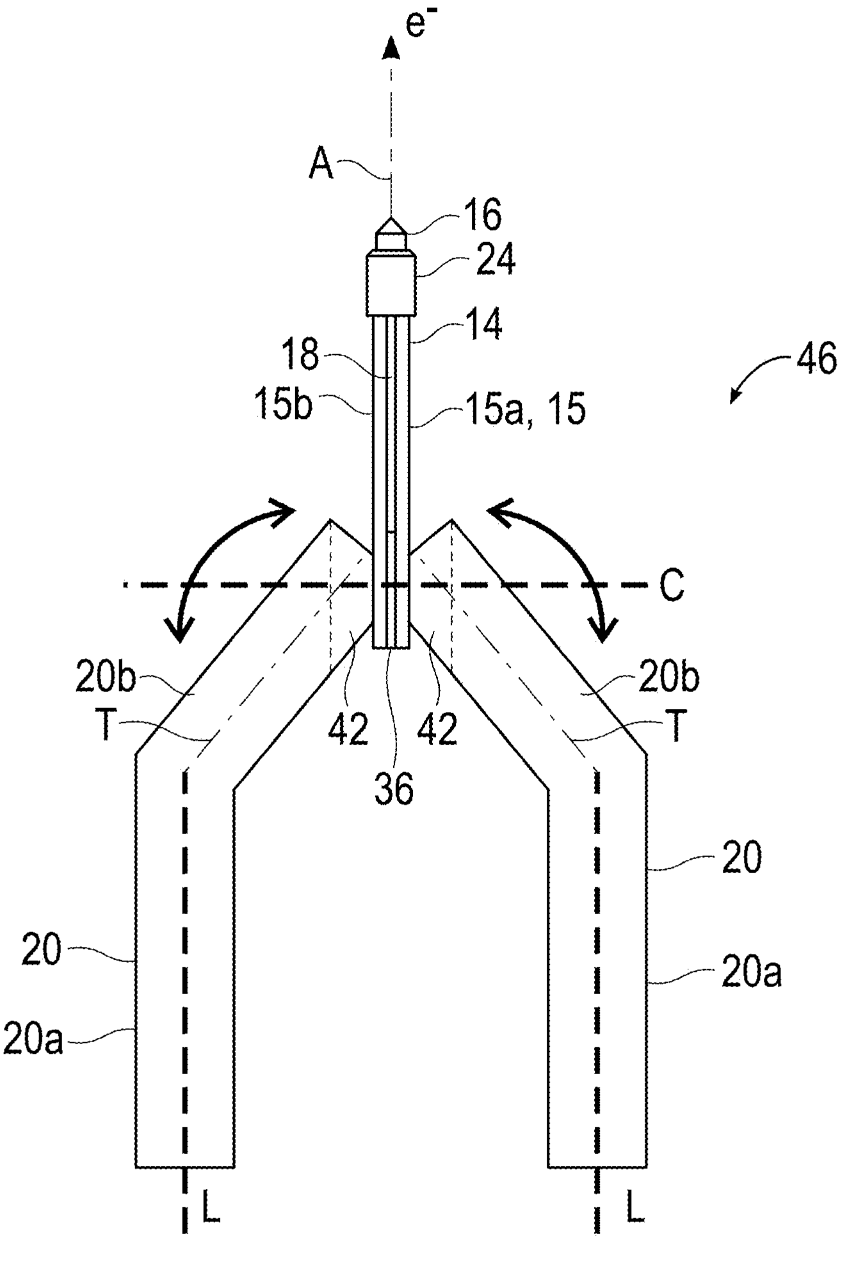
FIG. 9 is a side view of a portion of another embodiment of a cathode device.

FIG. 9 depicts another embodiment of a cathode device 46 in the present disclosure in which the distal contact portions 20*b* are bent only at a slight transverse angle relative to the longitudinal axis L, and compress the legs 15*a* and 15*b* of the graphite heater 14 therebetween with graphite blocks 42 along a common single clamp axis C. The distal contact portions 20*b* can resiliently bend as cantilevered beams. In some embodiments, the graphite blocks 42 can be omitted and the legs 15*a* and 15*b* of the graphite heater 14 can be directly compressed, gripped or held, between the distal contact portions 20*b* of pins 20 on opposite sides.

Figure 10A:
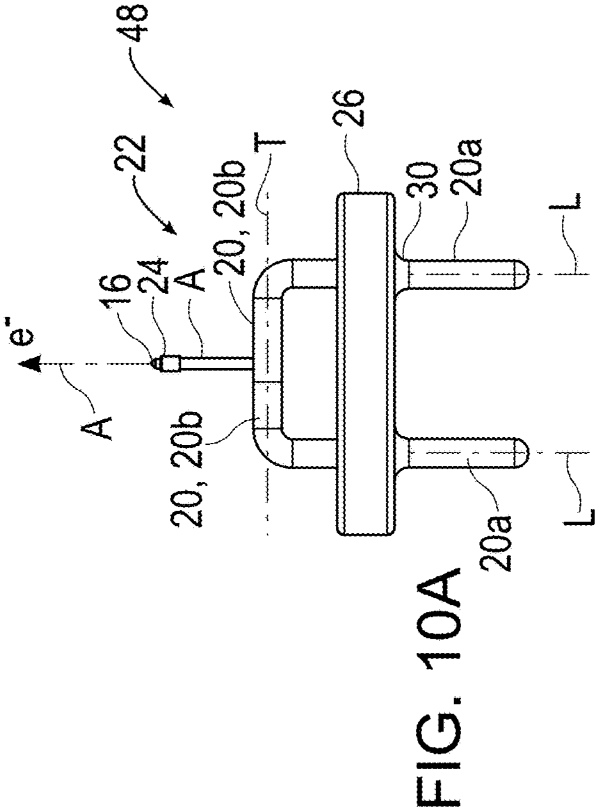
FIGS. 10A and 10B are front and side views of another embodiment of a cathode device.
Figure 10B:
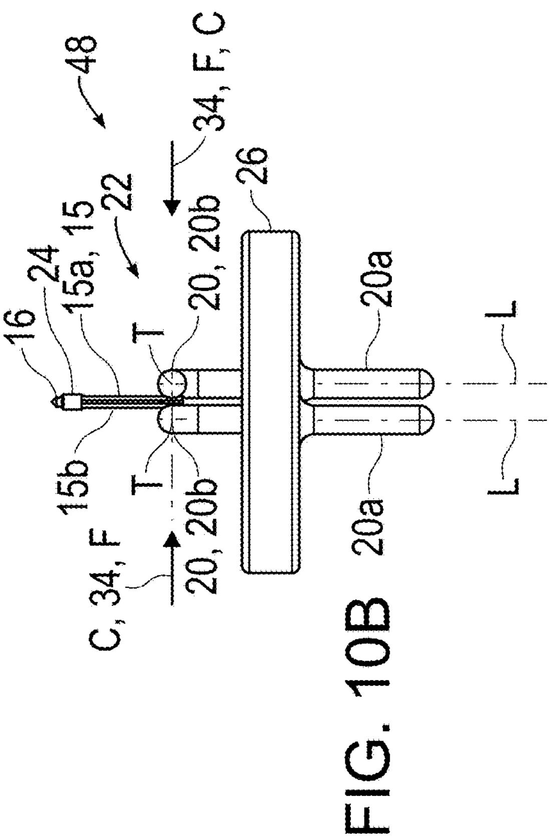

FIGS. 10A and 10B depict another embodiment of a cathode device 48 which is similar to cathode device 12, but can differ in that the distal contact portions 20*b* of cathode device 48 are spaced apart from the insulating member 26 a greater amount. This can raise or increase the distance that the emitter tip 16 is spaced above or apart from the insulating member 26. The remaining features can be similar cathode device 12.

Figure 11A:
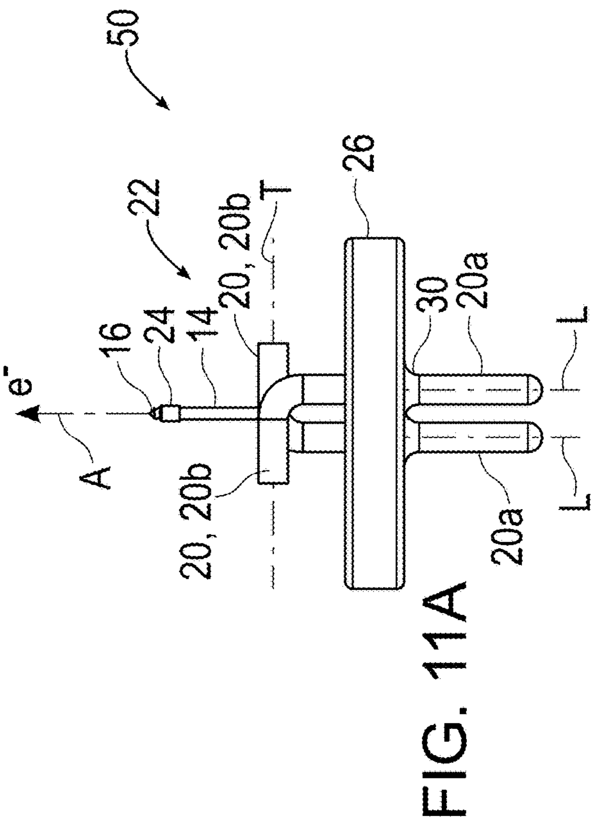
FIGS. 11A-11D are front, side and enlarged views of another embodiment of a cathode device.
Figure 11B:
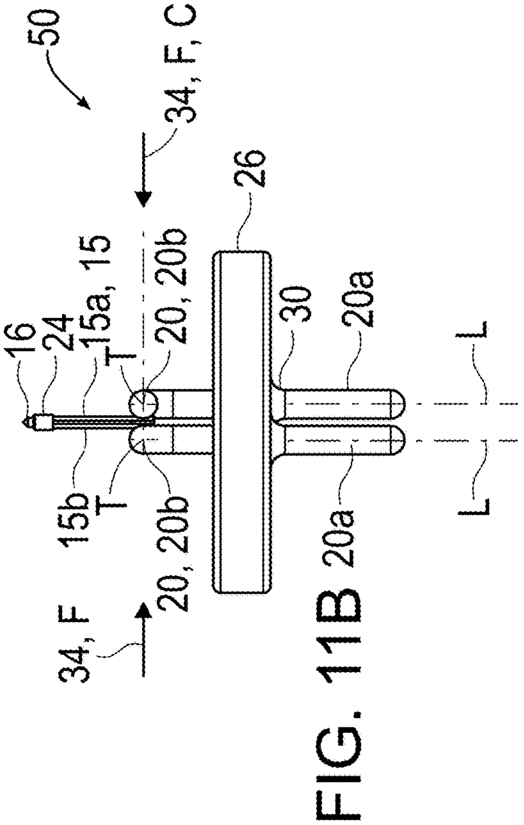
Figure 11C:
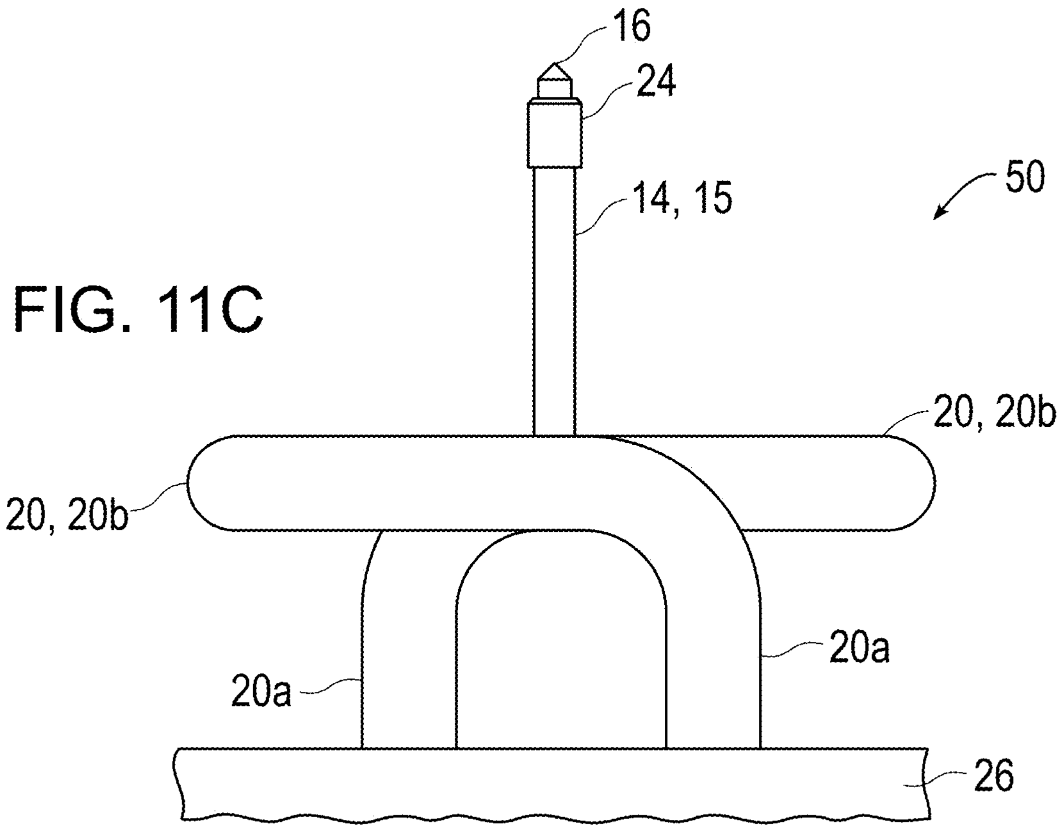
Figure 11D:
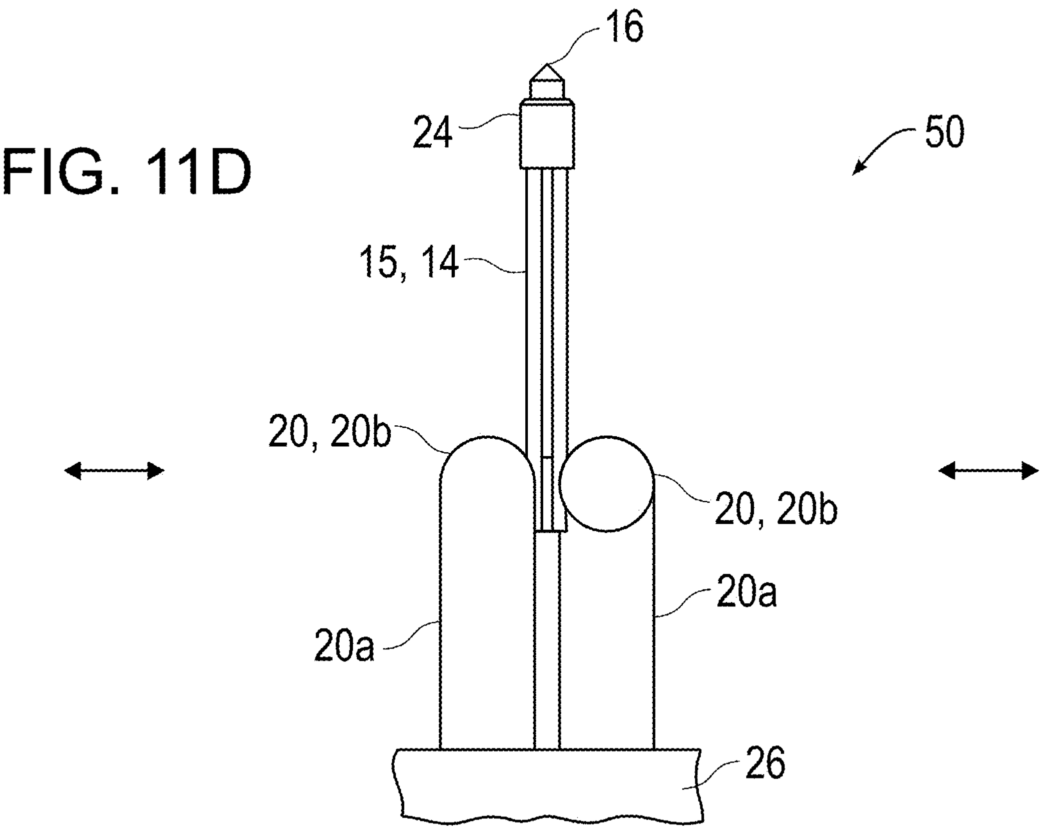

FIGS. 11A-11D depict another embodiment of a cathode device 50 which is similar to cathode device 48, but can differ in that the lateral or horizontal distal contact portions 20*b* are shorter in length, whereby the straight proximal portions 20*a* extending through the insulating member 26 are moved closer together, as seen in the front view of FIG. 11A. In the front view, the proximal portions 20*a* are spaced apart a distance that is only slightly greater than the diameter of the split rod portion 15 of heater 14, whereby the heater 14 is clamped in a manner where the outer diameter of the split rod 15 is generally aligned with the outer diameter of the two spaced apart proximal portions 20*a*. The spring force clamping the heater 14 can include the torsional spring force of the distal contact portions 20*b* about the longitudinal axis L and/or the resilient bending of the proximal portions 20*a* that are above the insulating member 26 relative to longitudinal axes L away from each other when the split rod 15 is positioned between the distal contact portions 20*b* as shown by the arrows in the side view of FIG. 11B. FIGS. 11C and 11D show an embodiment where the proximal portions 20*a* can be positioned a little further apart, and can include an emitter element 16 having about an 80 μm crystal flat and a heater 14 with about a 0.016 inch diameter.

Figure 12C:
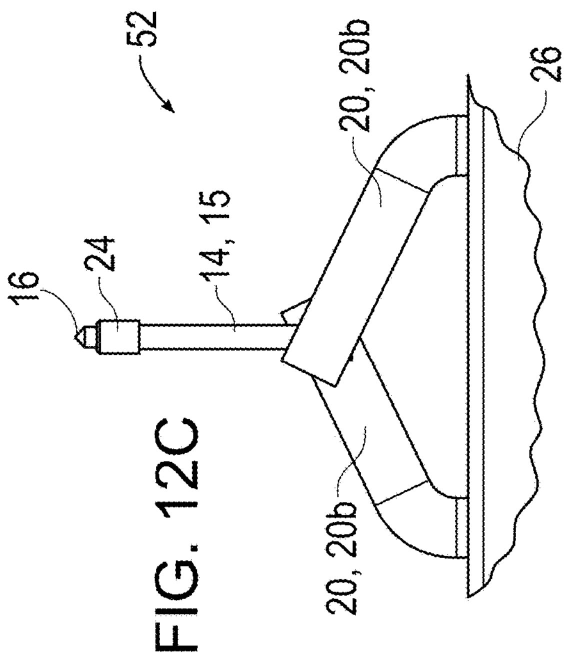
FIGS. 12A-12D are front, side and enlarged views of another embodiment of a cathode device.
Figure 12D:
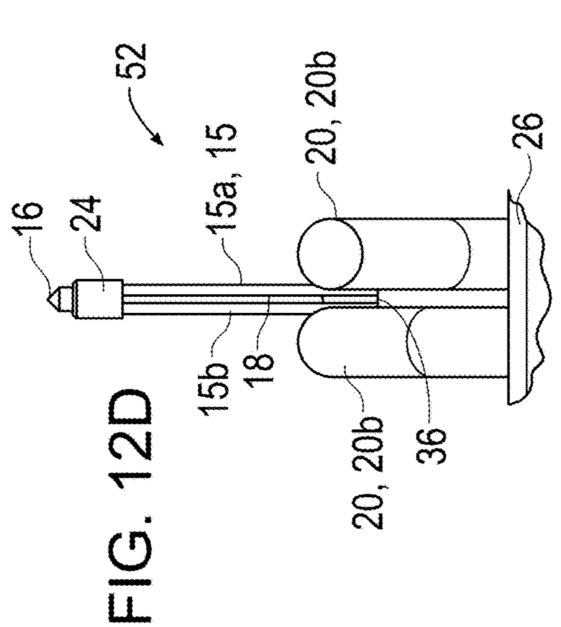
Figure 12A:
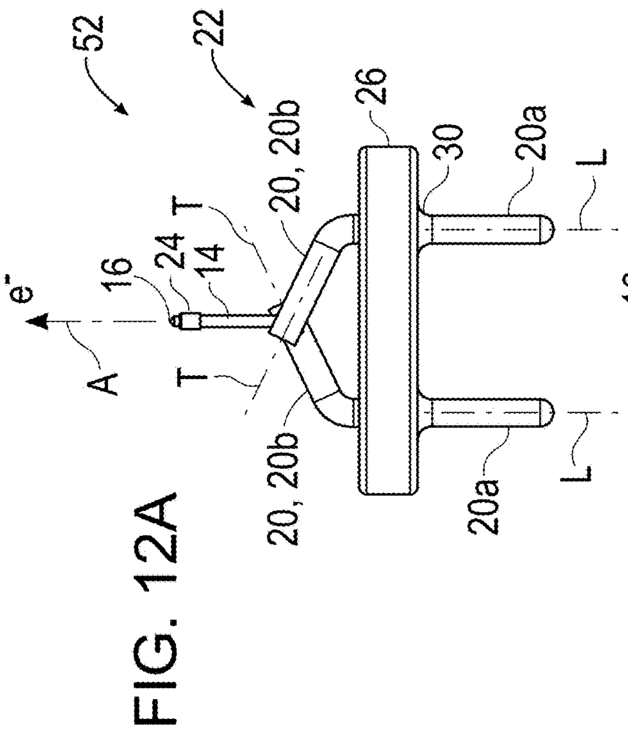
Figure 12B:
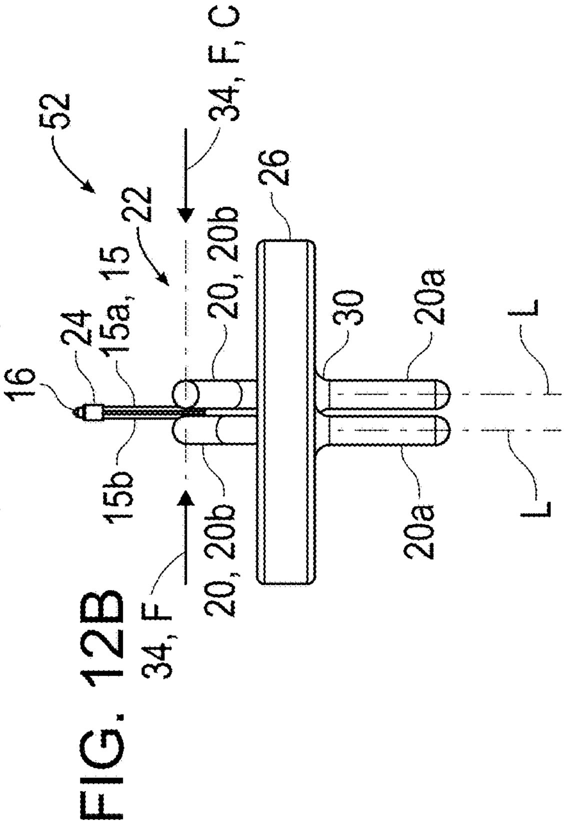

Referring to FIGS. 12A-12D, cathode device 52 is another embodiment in the present disclosure which is similar to cathode device 12 but differs in that the distal contact portions 20*b* can be bent along transverse axes T at a different or smaller angle relative to the longitudinal axes L, for example 600 instead of 90°, so that the distal contact portions 20*b* angle upwardly from the proximal portions 20*a* and away from insulating member 26. This can raise or increase the distance of the emitter tip 16 is spaced apart from the insulating member 26. In other embodiments, other angles can be used, for example 300 or 45°, or any other suitable angle to provide the desired distance of emitter tip 16 away from insulating member 26. The remaining features can be similar to cathode device 12. The spring force F for each pin 20 can include resilient torsion of the pin 20 about longitudinal axis L, and/or resilient bending of the distal contact portion 20*b* relative to transverse axis T, and/or axis L. FIGS. 12C and 12D depict an embodiment having an emitter element 16 with about a 50 μm crystal flat and a heater 14 with about a 0.016 inch diameter.

Figure 12F:
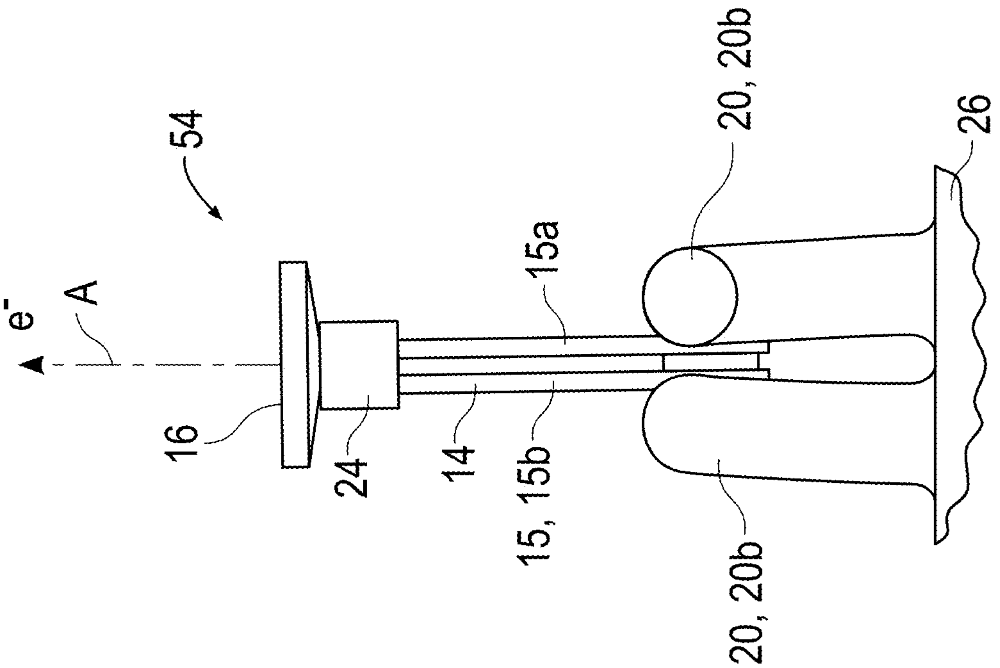
FIG. 12E is a perspective view of another embodiment of a cathode device and FIG. 12F is an enlarged side view thereof.
Figure 12E:
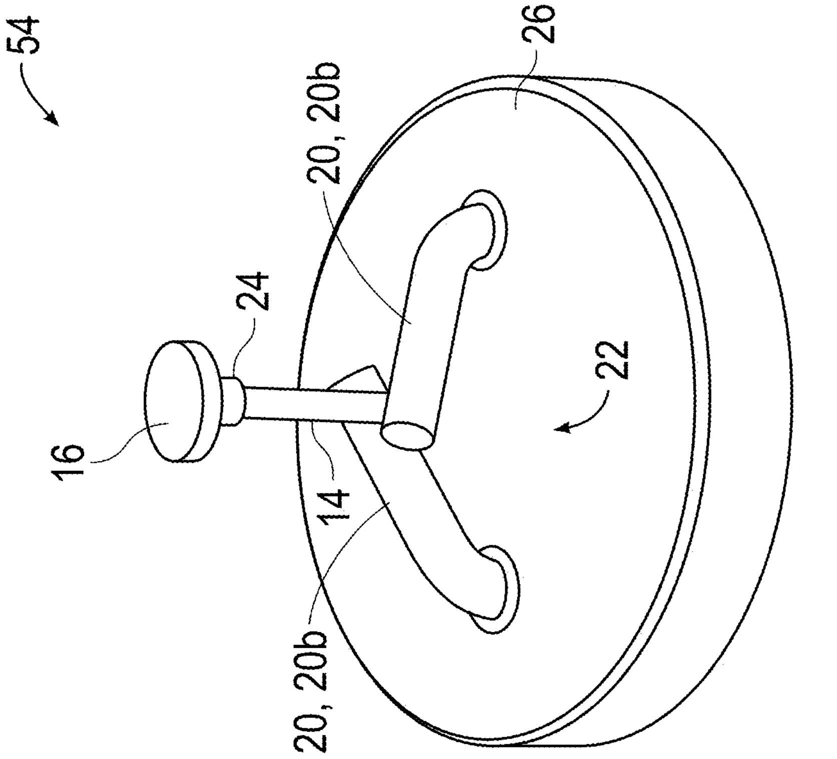

FIGS. 12E and 12F depict another embodiment of a cathode device 54 which is similar to cathode device 52, but differs in that the heater 14 can have an emitter element 16 that is disk shaped with a flat top surface having about a 2 mm crystal flat. The heater 14 can have a diameter about 0.021 inches.

Figure 13A:
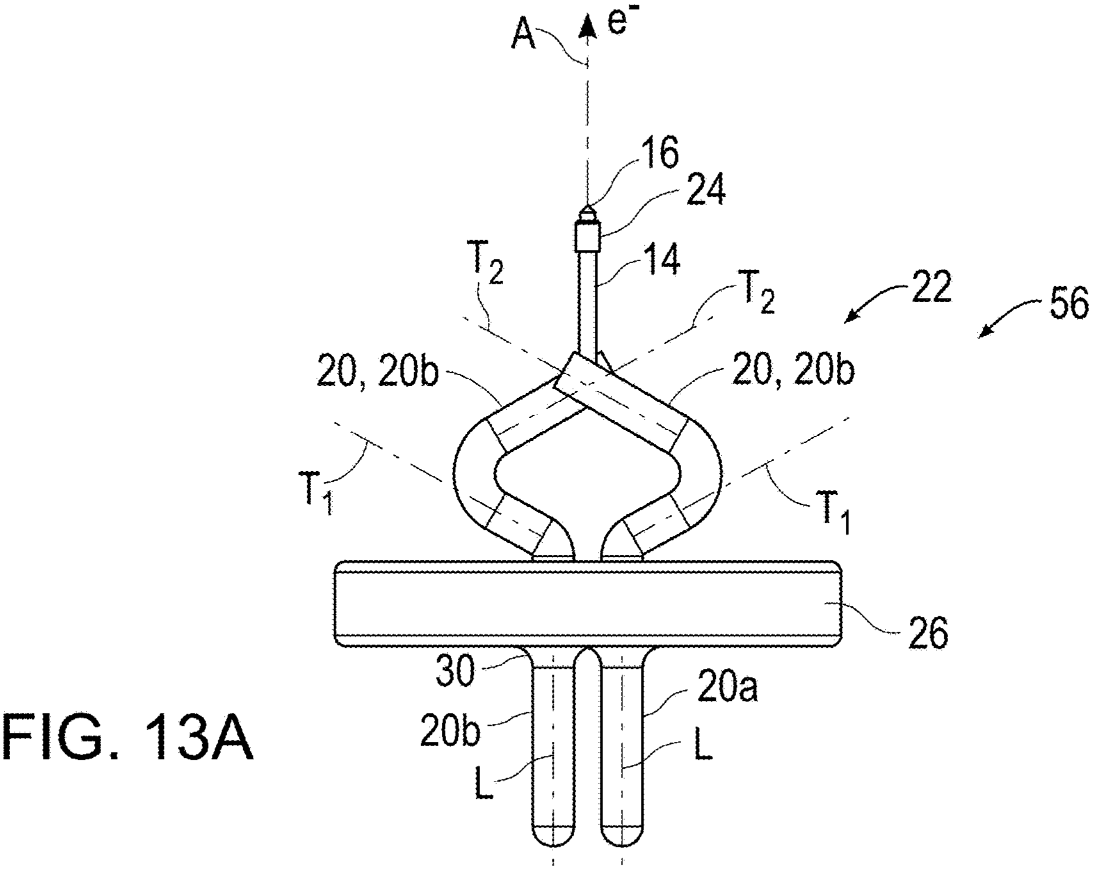
FIGS. 13A and 13B are front and side views of another embodiment of a cathode device.
Figure 13B:
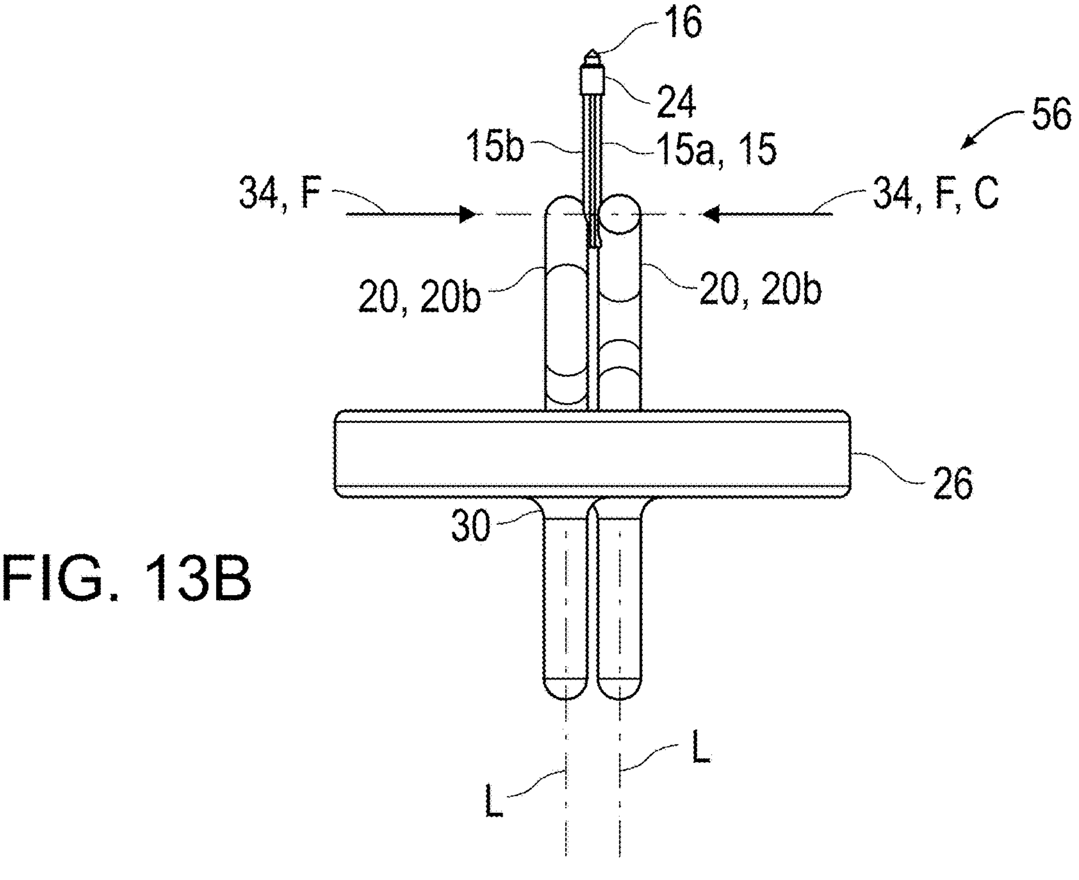

FIGS. 13A and 13B depict another embodiment of a cathode device 56 which differs from cathode device 52 in that the distal contact portions 20*b* after passing through the insulating member 26 are bent upwardly and outwardly away from each other, each along a first transverse axis $T_1$, for example 600 relative to a corresponding longitudinal axis L, and then bent upwardly and inwardly towards each other, each along a second transverse axis $T_2$, for example 600 relative to a corresponding longitudinal axis L. The distal ends of the distal contact portions 20*b* can overlap each other to clamp the split rod 15 of heater 14 therebetween. This can further increase the height or distance of the emitter tip 16 from the insulating member 26 than that provided in cathode device 52. The spring force F exerted on split rod 15 by each pin 20 can be provided by torsional spring force about longitudinal axis L, and resilient bending of the distal contact portion 20*b* relative to axes $T_1$, $T_2$ and/or L.

Figure 14:
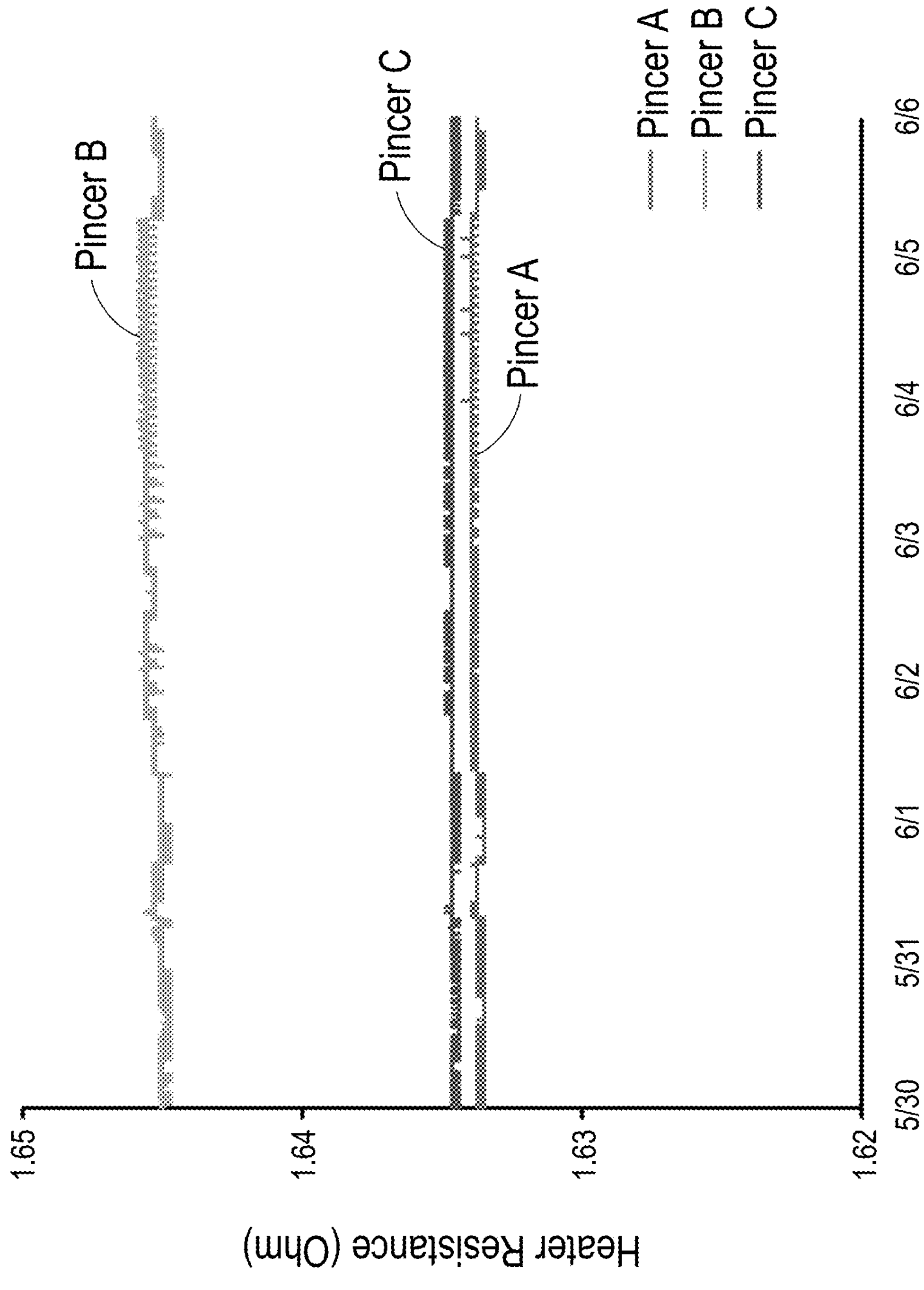
FIG. 14 is a graph showing heater resistance versus time for three samples of the same pincer mount cathode device.

FIG. 14 is a graph showing heater electrical resistance for three samples of the same pincer mount cathode device operating at 1800° K, which can naturally vary in a small range of about 0.01 ohms. In the graph, it can be seen that the resistance of each sample remains steady over time, but each sample can have a slightly different resistance. For example, pincer mount cathode device A can have a resistance of about 1.634 ohms, pincer mount cathode device B can have a resistance of about 1.645 ohms, and pincer mount cathode device C can have a resistance of about 1.635 ohms.

Figure 15A:
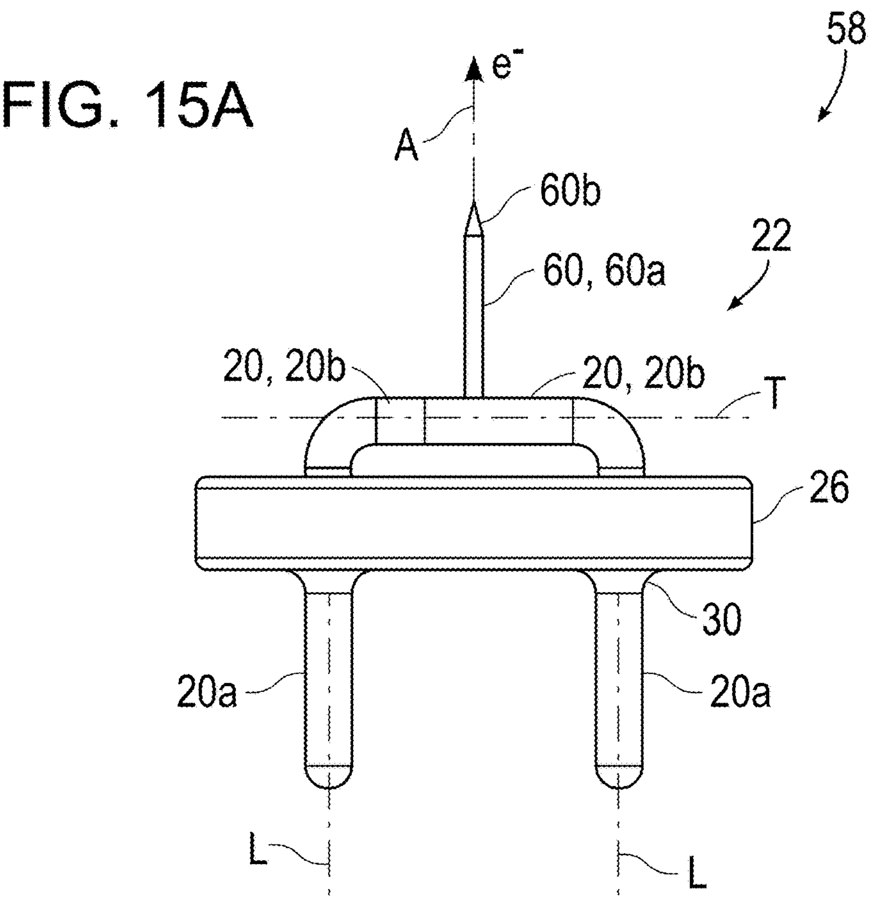
FIGS. 15A and 15B are front and side views of yet another cathode device in the present disclosure.
Figure 15B:
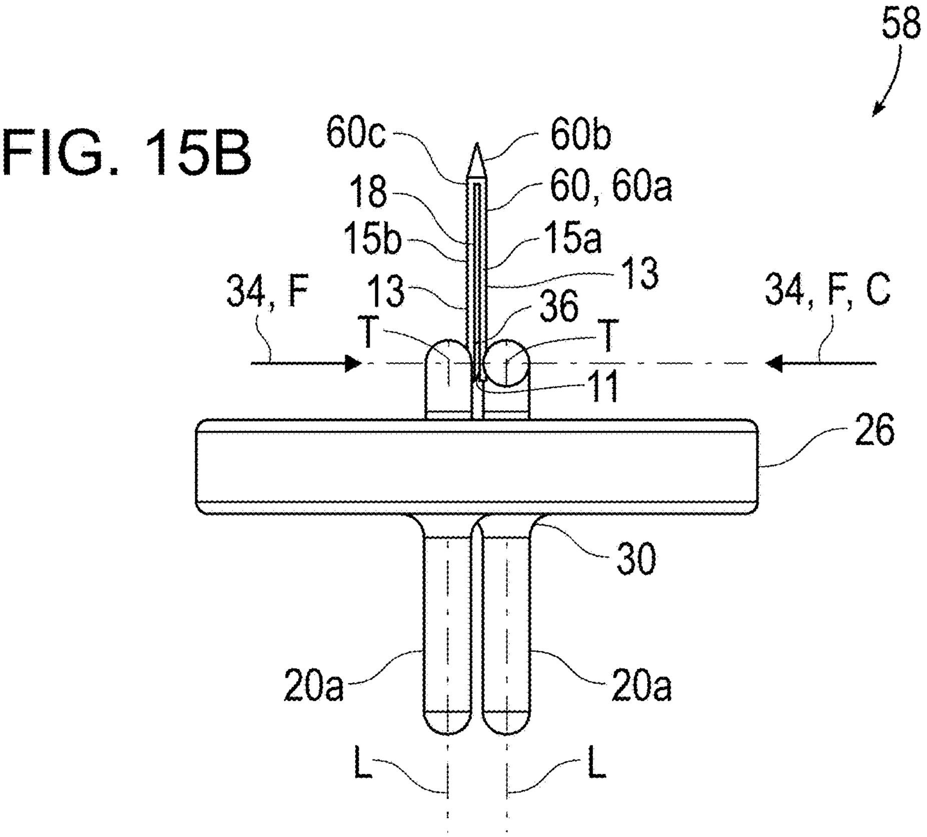

FIGS. 15A and 15B depict another embodiment of a cathode device 58 in the present disclosure which differs from cathode device 12 in that a single piece unitary elongate heater/emitter 60 extending along central emitter axis A formed of a single piece of refractory metal or metal alloy such as tungsten or tungsten alloy, can replace the graphite heater 14. Heater/emitter 60 can have an elongate proximal split rod portion 60*a* having legs 15*a* and 15*b* with a slot 18 therebetween, and rounded or curved outer surfaces 13. The distal end of the heater/emitter 60 can be an emitter tip 60*b* for emitting electrons $e^-$ along axis A, and can be tapered into a cone or near cone (frustoconical) as shown, or can have other suitable shapes, such as a disk shape. An intermediate connecting or transition portion 60*c* can be located between the emitter tip 60*b* and the split rod portion 60*a*, whereby the emitter tip 60*b* extends in the distal direction way from the connecting portion 60*c*, and the legs 15*a* and 15*b* extend in the proximal direction away from the connecting portion 60*c*. The inner surfaces 11 can be flat and an insulating member 36 can be positioned therebetween. The proximal end of the legs 15*a* and 15*b* can be clamped by the distal contact portions 20*b* of pins 20. When electrical power is provided to the heater/emitter 60, electrical current can flow through the legs 15*a* and 15*b* in a similar manner as shown in FIG. 4, moving or travelling up leg 15*b*, across connecting portion 60*c*, and down leg 15*a*. Electrons $e^-$ can be formed and emitted from the emitter tip 60*b* along axis A. By forming the heater/emitter 60 in one piece of the same material, manufacturing processes can be simplified.

While example embodiments have been particularly shown and described, it will be understood by those skilled in the art that various changes in form and details may be made therein without departing from the scope of the embodiments encompassed by the appended claims. Although particular dimensions are described, it is understood that the dimensions can vary depending upon the situation at hand. In addition, various features of the different embodiments disclosed can be combined together or omitted.

What is claimed is:

1. A cathode device comprising:

an emitter element for generating electrons;

an elongate graphite heater having proximal and distal ends, the emitter element being mounted to the graphite heater in an emitter mount at the distal end, two spaced apart legs extend from the emitter mount, terminating at the proximal end and forming an elongate slot therebetween; and two electrical contacts compressively engage respective opposite outer surfaces of the two spaced apart legs at the proximal end of the graphite heater to mechanically secure and electrically connect the two legs of the graphite heater to respective electrical contacts at a junction that is at a location spaced away from the emitter element to keep the junction cooler.

2. The cathode device of claim 1 in which the two electrical contacts are resiliently biased against the legs and towards each other.

3. The cathode device of claim 2 in which each electrical contact comprises a metallic pin having a proximal portion extending along a longitudinal axis, each pin having a distal contact portion that is bent transverse to the longitudinal axis, each pin being rotationally biased about a respective longitudinal axis to bias the distal contact portion of each pin against a respective leg and towards each other.

4. The cathode device of claim 3 in which the proximal portion of each pin extends through an insulating member along a respective longitudinal axis.

5. A cathode device comprising:
an emitter tip for generating electrons;
an elongate heater having proximal and distal ends, the emitter tip being located at at the distal end of the heater, two spaced apart legs extend away from the distal end of the heater, terminating at the proximal end and forming an elongate slot therebetween; and
two electrical contacts compressively engage respective opposite outer surfaces of the two spaced apart legs at the proximal end of the heater to mechanically secure and electrically connect the two legs of the heater to respective electrical contacts at a junction that is at a location spaced away from the emitter tip to keep the junction cooler.

6. The cathode device of claim 5 in which the two electrical contacts are resiliently biased against the legs and towards each other.

7. The cathode device of claim 6 in which each electrical contact comprises a metallic pin having a proximal portion extending along a longitudinal axis, each pin having a distal contact portion that is bent transverse to the longitudinal axis, each pin being rotationally biased about a respective longitudinal axis to bias the distal contact portion of each pin against a respective leg and towards each other.

8. The cathode device of claim 7 in which the proximal portion of each pin extends through an insulating member along a respective longitudinal axis.

9. The cathode device of claim 7 in which the distal contact portion of each pin is bent at a right angle to the longitudinal axis.

10. The cathode device of claim 5 in which the emitter tip is an emitter element that is mounted to an elongate graphite heater in an emitter mount at the distal end of the graphite heater.

11. The cathode device of claim 5 in which the emitter tip and the elongate heater are in a single piece heater/emitter formed from a unitary piece of refractory metal.

12. The cathode device of claim 11 in which the single piece heater/emitter is formed of tungsten or tungsten alloy.

13. The cathode device of claim 5 further comprising an electrical insulating spacer member compressed between the two spaced apart legs of the heater at the proximal end of the heater.

14. A method of forming a cathode device comprising:
providing an emitter element for generating electrons;
providing an elongate graphite heater having proximal and distal ends, the emitter element being mounted to the graphite heater in an emitter mount at the distal end, two spaced apart legs extend from the emitter mount, terminating at the proximal end and forming an elongate slot therebetween; and
with two electrical contacts, compressively engaging respective opposite outer surfaces of the two spaced apart legs at the proximal end of the graphite heater to mechanically secure and electrically connect the two legs of the graphite heater to respective electrical contacts at a junction that is at a location spaced away from the emitter element to keep the junction cooler.

15. The method of claim 14 further comprising resiliently biasing the two electrical contacts against the legs and towards each other.

16. The method of claim 15 in which each electrical contact comprises a metallic pin having a proximal portion extending along a longitudinal axis, each pin having a distal contact portion that is bent transverse to the longitudinal axis, the method further comprising rotationally biasing each pin about a respective longitudinal axis to bias the distal contact portion of each pin against a respective leg and towards each other.

17. The method of claim 16 further comprising extending the proximal portion of each pin through an insulating member along a respective longitudinal axis.

18. A method of forming a cathode device comprising:
providing an emitter tip for generating electrons;
providing an elongate heater having proximal and distal ends, the emitter tip being located at the distal end of the heater, two spaced apart legs extend away from the distal end of the heater, terminating at the proximal end and forming an elongate slot therebetween; and
with two electrical contacts, compressively engaging respective opposite outer surfaces of the two spaced apart legs at the proximal end of the heater to mechanically secure and electrically connect the two legs of the heater to respective electrical contacts at a junction that is at a location spaced away from the emitter tip to keep the junction cooler.

19. The method of claim 18 further comprising resiliently biasing the two electrical contacts against the legs and towards each other.

20. The method of claim 19 in which each electrical contact comprises a metallic pin having a proximal portion extending along a longitudinal axis, each pin having a distal contact portion that is bent transverse to the longitudinal axis, the method further comprising rotationally biasing each pin about a respective longitudinal axis to bias the distal contact portion of each pin against a respective leg and towards each other.

21. The method of claim 20 further comprising extending the proximal portion of each pin through an insulating member along a respective longitudinal axis.

22. The method of claim 20 further comprising providing the distal contact portion of the pin with a bend at a right angle to the longitudinal axis.

23. The method of claim 18 further comprising providing the emitter tip as an emitter element that is mounted to an elongate graphite heater in an emitter mount at the distal end of the graphite heater.

24. The method of claim 18 further comprising providing the emitter tip and the elongate heater in a single piece heater/emitter formed from a unitary piece of refractory metal.

25. The method of claim 24 further comprising providing a single piece heater/emitter that is formed of tungsten or tungsten alloy.

26. The method of claim 18 further comprising compressing an electrical insulating spacer member between the two spaced apart legs of the heater at the proximal end of the heater.

* * * * *